March 18, 1958     E. T. KINDT     2,827,259
VALVE
Filed Jan. 2, 1953     4 Sheets-Sheet 2
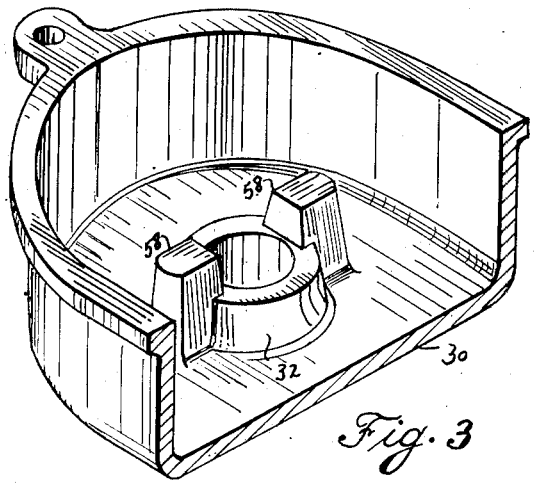
Fig. 3
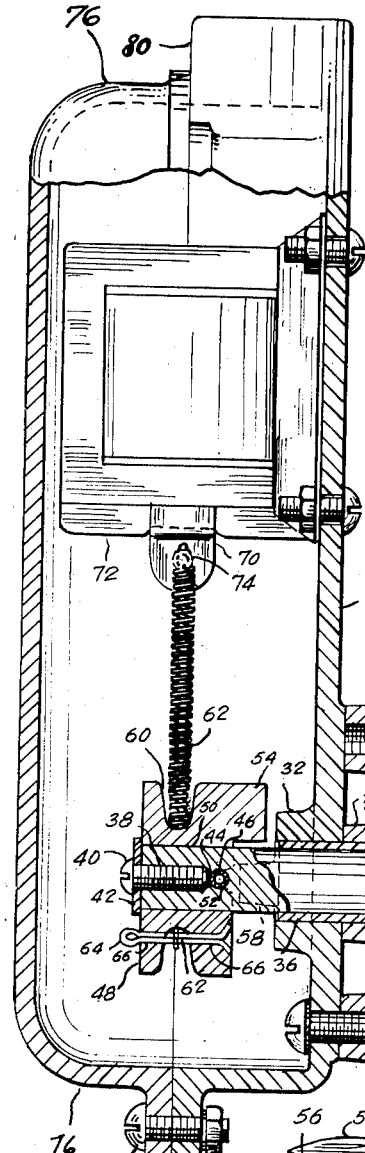
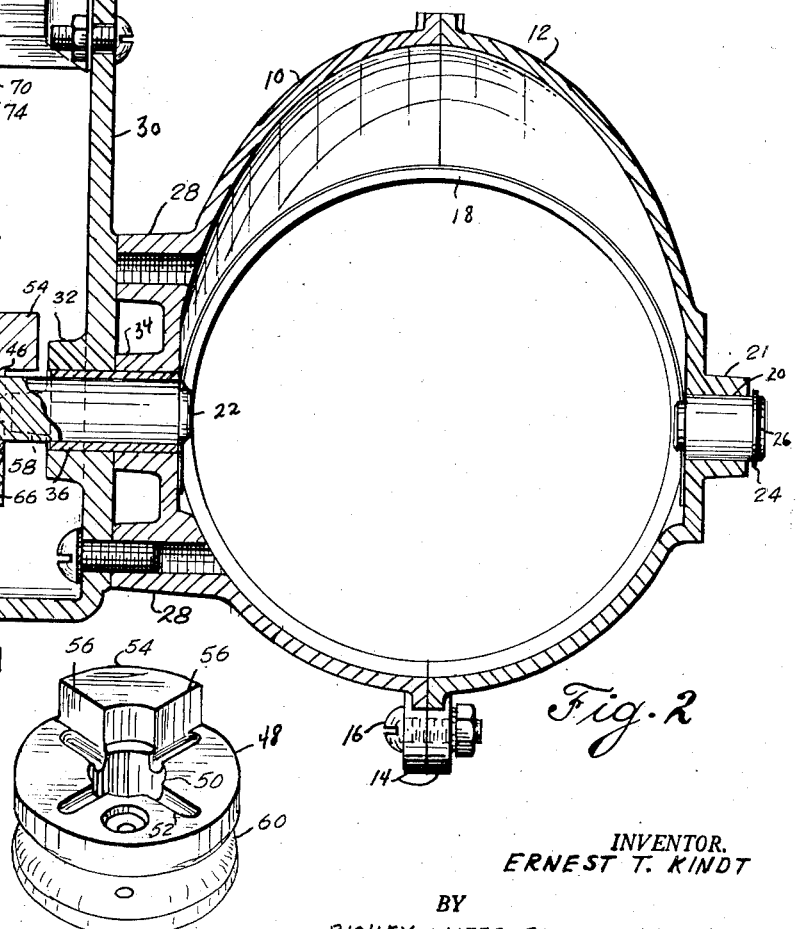
Fig. 2
Fig. 4
INVENTOR.
ERNEST T. KINDT
BY
RICHEY, WATTS, EDGERTON & McNENNY
ATTORNEYS March 18, 1958 E. T. KINDT 2,827,259
VALVE
Filed Jan. 2, 1953 4 Sheets-Sheet 3
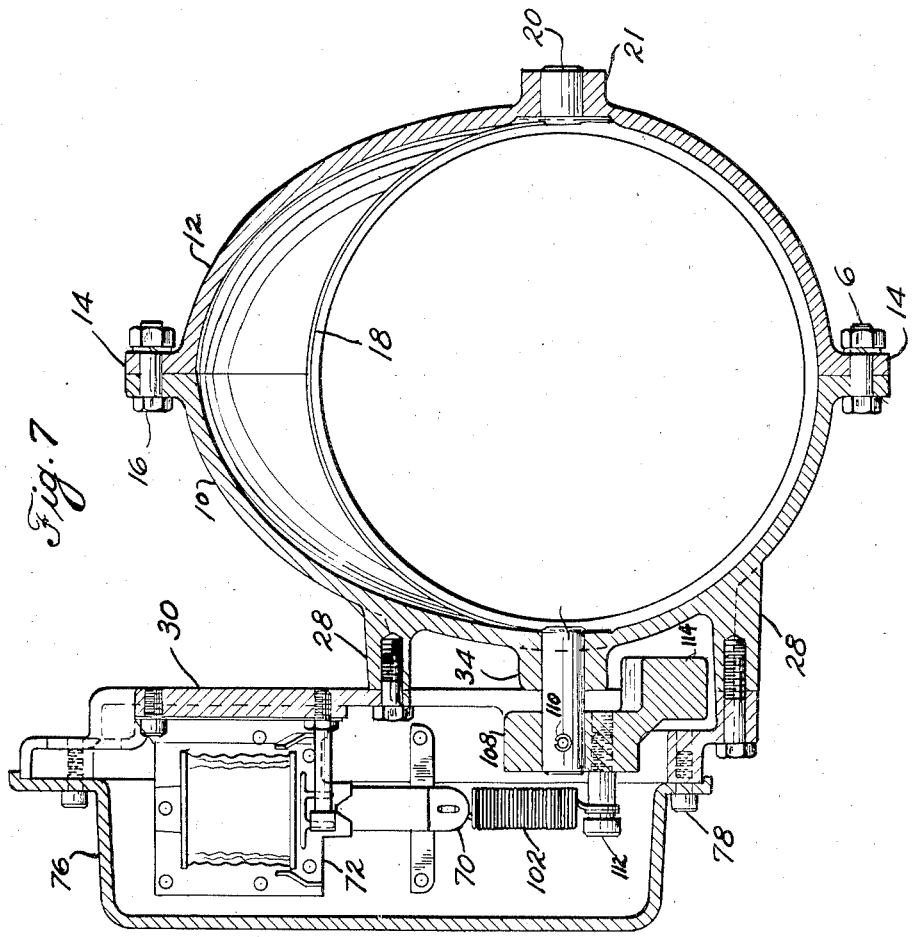
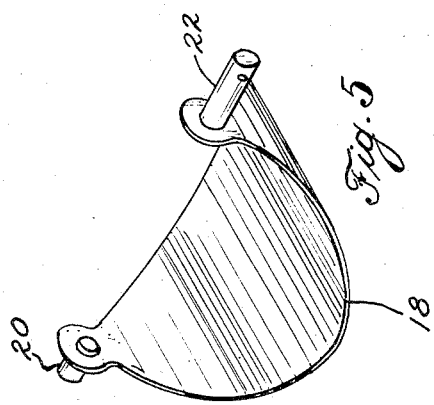
INVENTOR.
ERNEST T. KINDT
BY
RICHEY, WATTS, EDGERTON & McNENNY
ATTORNEYS March 18, 1958 E. T. KINDT 2,827,259
VALVE Filed Jan. 2, 1953 4 Sheets-Sheet 4

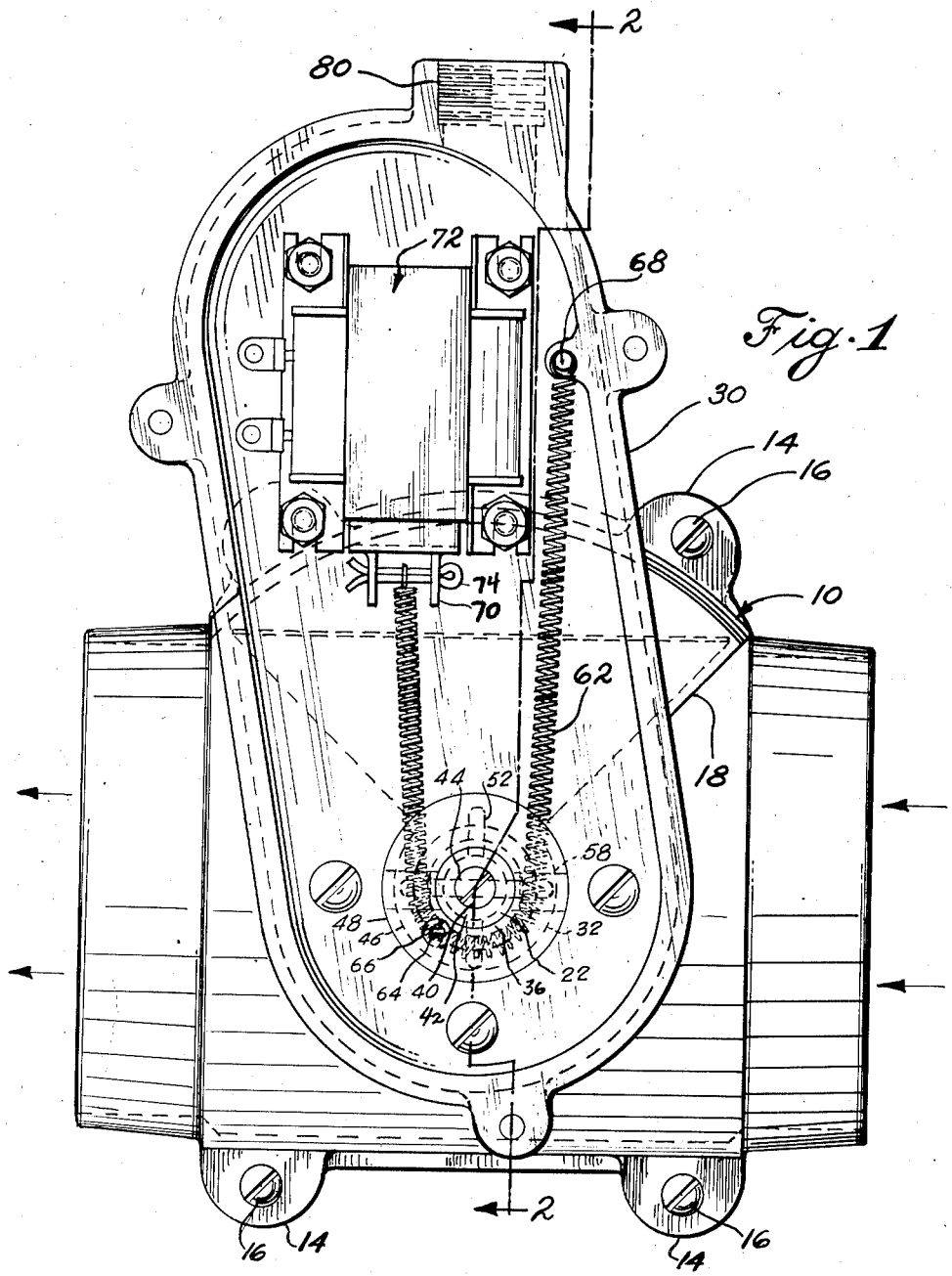

INVENTOR.
ERNEST T. KINDT
BY
RICHEY, WATTS, EDGERTON & McNENNY
ATTORNEYS

United States Patent Office 2,827,259
Patented Mar. 18, 1958

2,827,259

VALVE

Ernest T. Kindt, Lakewood, Ohio

Application January 2, 1953, Serial No. 329,394

3 Claims. (Cl. 251—80)

This invention relates to rotary valves and, more particularly, to shut-off valves for air ducts operating at near atmospheric pressure for use in dust collecting systems. In the operation of a dust collecting system wherein several branches are connected to a blower, economy of operation may be obtained by closing the ducts which are connected to machines not in use. In this manner, a blower and dust separator having a fraction of the total capacity required for operating a system having all of the branches open may be used with satisfactory results.

When a dust collecting system is operated with all of the branches open, a large amount of air is taken from the building in which the machinery is housed. This adds considerably to the heating load for maintaining comfortable working conditions, since the air must be replaced by outside air requiring considerable heating in the winter. By reducing the amount of air capacity in the dust collecting system, the amount of heat required is thereby reduced, thus increasing the overall economy of the plant operation.

In providing for valves for controlling the air flow in dust system ducting, there are certain features which must be considered in determining the suitability of the control valve. Any obstructions or sudden changes in directions of the conduit result in accumulations of foreign materials which may render the particular branch of the system inoperative. Further, if portions of the valve are in the flow path, foreign objects may accumulate thereon and cause the valve to cease to function. Therefore, the optimum in valve structure is one having a completely open and clear channel with a cross-sectional area equal to that of the conduit in which the valve is mounted, thereby eliminating the possibility of entrapment of foreign objects in the flow passage. Also, the valve should be essentially balanced, thus reducing the power required to open and close the same which enhances the reliability of operation under all conditions of flow and pressure. The valve should incorporate operating and control mechanism capable of opening and closing the valve under all conditions and which would not be damaged in the event parts of the valve become inoperative or the presence of foreign material prevents the normal travel of the closing member.

Accordingly, it is the primary object of this invention to provide a shut-off valve which will present a straight-through unobstructed flow path when in the open position.

Another object of this invention is to provide a valve having the forces on the operating parts balanced in such a way that the minimum of effort is required from the operating mechanism for opening and closing the valve.

A further object of this invention is to provide a valve operating mechanism which will not be damaged if for any reason the valving member is restrained from being actuated through its normal path of travel.

A still further object of this invention is to provide a valve operating mechanism capable of being easily adjusted to accommodate mounting the valve in various positions as required by the configuration of the ducting in which it is placed.

Other objects and advantages, more or less ancillary to the foregoing, and the manner in which all the various objects are realized will appear in the following description which, considered in connection with the accompanying drawings, sets forth the preferred embodiment of the invention.

In the drawings:

Fig. 1 is a side elevational view of the valve having the cover plate removed from the operating mechanism housing;

Fig. 2 is a cross-sectional view taken along line 2—2 of Fig. 1;

Fig. 3 is a fragmentary perspective view of a portion of the housing showing the bearing boss and stops for the operating mechanism;

Fig. 4 is a perspective view of the pulley for rotating the valve member;

Fig. 5 is a perspective view of the valve member;

Fig. 7 is a cross-sectional view taken along line 7—7 of Fig. 6.

Figure 6:
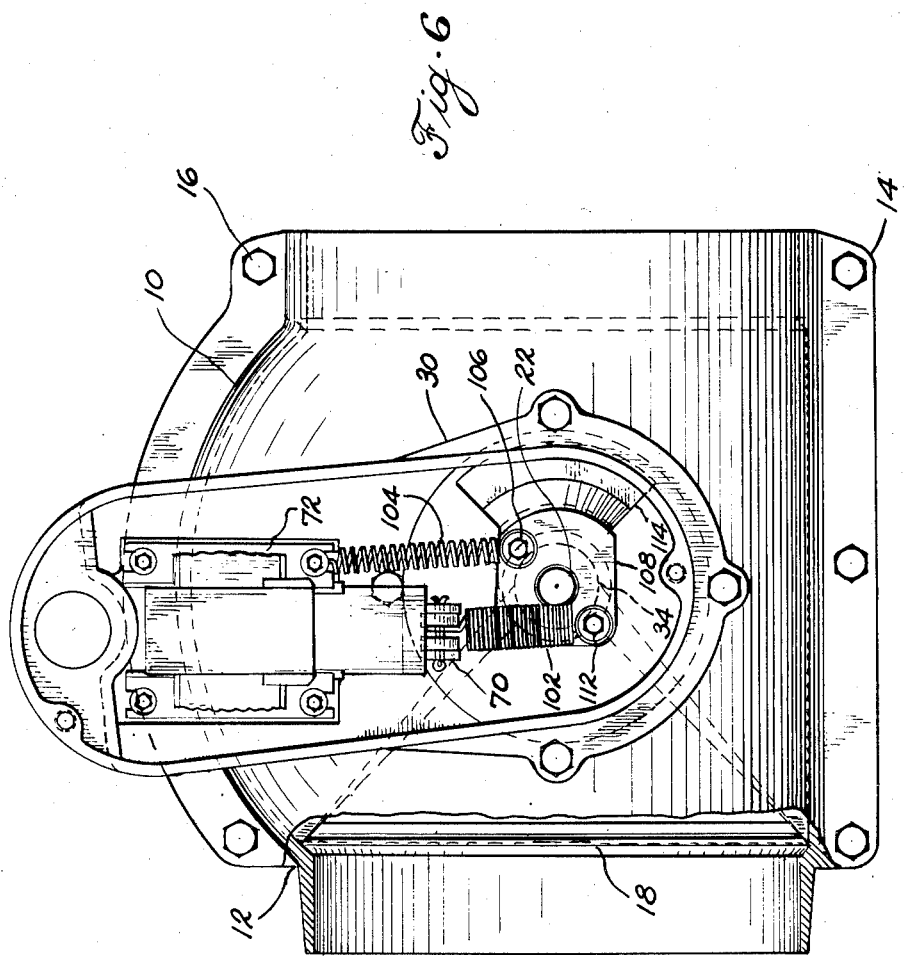
Fig. 6 is a side elevational view of a modified form of the valve.

Referring first to Fig. 1 in which is shown a valve that is the preferred embodiment of my invention, the body portion of a valve is formed in two sections 10 and 12, respectively. Sections 10 and 12 are maintained in assembled relation by perforate flanges 14 having bolts 16 secured therethrough. The valve body formed by the assembly of the sections 10 and 12 is substantially tubular with an enlarged portion on one side to accommodate the rotation of the valve member 18. The valve member 18 is semi-circular in cross-section and represents a segment taken from the side of a cylinder.

The valve member 18 is provided with a pair of pintles 20 and 22. Pintle 20 is affixed to the member 18 at the center of rotation on one side thereof and extends through a boss 21 on the side of the housing section 12. The boss 21 provides a bearing for rotatably carrying the pintle. A snap ring 24 is disposed in a groove 26 formed in the end of pintle 20 for maintaining pintle 20 in the boss 21 during operation of the valve.

Threaded bosses 28 are formed on the valve body section 10 for carrying the valve operating mechanism housing 30. In the preferred embodiment, four bosses are provided disposed equidistantly on a circle thereby allowing the housing 30 to be positioned in four different angular relationships with the centerline of the valve body. The housing 30 has a boss 32 formed on the inner wall thereof in alignment with a boss 34 formed on the outer wall of the section 10. The bosses 32 and 34 are drilled to receive a suitable bearing sleeve 36 which rotatably carries the pintle 22 affixed to the valve member 18.

Pintle 22 extends beyond the face of the boss 32 and has a threaded axial bore 38 formed in the end thereof for threadably receiving a screw 40 which holds a washer 42 in engagement with the end of pintle 22. The pintle 22 is also cross-drilled to provide a bore 44 for receiving a pin 46 which extends beyond the pintle 22 in each direction.

A pulley 48 having an axial bore 50 therethrough is mounted on the pintle 22, the pintle 22 extending through the bore 50. In the inner face of the pulley 48, a pair of diametrical grooves 52 are formed in perpendicular relationship. The grooves 52 engage the pin 46 when the pulley 48 is placed on the pintle 22 and held in operating position by the screw 40 and washer 42. To change the position of the pulley 48 relative to the pintle 22, the screw 40 is backed out until the pulley may be moved axially with respect to the pintle 22 whereupon the grooves 52 are disengaged from the pin 46. The pulley may then be rotated to bring a different groove into engagement with the pin as required to operate the valve member 18 through the proper angular displacement. The provision of this structure simplifies the adjusting of the angle of the operating mechanism relative to the valve body.

The pulley 48 has a laterally extending portion 54 between two of the grooves 52; the opposed ends 56 of the laterally extending portion 54 are parallel to the diametrical centerlines through the adjacent grooves 52. A pair of stops 58 are formed on the housing 30 adjacent the boss 32 and project beyond the end of said boss 32. The stops 58 engage the ends 56 of portion 54 and restrict the motion of the pulley to an arcuate travel of 90°.

A groove 60 having a semi-circular bottom is formed in the pulley 48 for receiving an extensible spring 62 which acts as a belt in said groove. The spring 62 is affixed to the pulley 48 by the cotter pin 64 extending through openings 66 in the pulley 48 and the spring 62. One end of spring 62 is anchored to the housing 30 by a pin 68. The opposed end of the spring is joined to the armature 70 of a solenoid by key 74. When the solenoid 72 is energized, the armature pulls into position providing tension in the spring 62 between the armature 70 and the pulley 48. This tension induces rotation of the valve member 18 through the pulley 48 and pintle 22. A lesser amount of tension is produced in the portion of the spring between the anchor 68 and the pulley 48 which serves to return valve member 18 to the closed position upon deenergization of solenoid 72 and release of the armature 70. The provision of the resilient connecting member, i. e. spring 62, allows the armature 70 of the solenoid 72 to complete its movement irrespective of the movement of the pulley. If the solenoid 72 were to be energized and armature 70 not immediately pulled in, the electrical current through the solenoid 72 would be excessive causing damage and failure of the device. Therefore, the provision of the spring 62 prevents damage to the operating mechanism of the valve if the valve member 18 were to become jammed by foreign material or inoperable.

A cover plate 76 is mounted on the housing 30 and held in fixed relationship thereto by a plurality of bolts 78. A conduit connection 80 in the wall of the housing 30 is provided for making the necessary electrical connections to the solenoid 72.

In the alternate form of my invention, as illustrated in Figs. 6 and 7, like parts have like numbers, the modification being in the operating mechanism which utilizes a pair of springs 102 and 104 for causing rotation of the pintle 22 and valve member 18. The spring 104 is anchored at one end to the frame of the valve and at the other end to a pin 106 affixed to a spool 108 which is affixed to the pintle 22 by a pin 110. The spring 102 has one end affixed to the armature 70 and the other end pivotally joined to a pin 112 affixed to the spool 108 diametrically opposite the pin 106 in relation to the center of rotation of the spool. Spring 102 is stronger than spring 104 thereby overcoming the tension of the spring 104 when the solenoid 72 is energized. Spool 108 is provided with a counterweight 114 which assists the operation of the valve by balancing the weight of the member 18. As in the preferred embodiment, the return spring 102 has sufficient tension to operate the valve, but insufficient tension to overcome the force of the solenoid 72 thus allowing the armature 70 to move to its normal position whether the valve member 18 moves or not.

In operation, the valve is mounted in a duct line as shown in Fig. 6. Electrical connections are made to the starting switch of the machine to which the duct line is attached in such a manner that the solenoid 72 is energized when the machine drive is energized. As shown in Fig. 6, the valve member is across the opening thus closing the valve to flow therethrough when the solenoid is deenergized. Upon actuation of the starting switch, the solenoid 72 applies tension to the spring 62 which rotates the valve member into the position shown in Fig. 1. Since the valve member is semi-circular in form, it completes the upper surface of the flow channel through the valve making the flow path continuously cylindrical therethrough. Consequently, there can be no obstructions or edges on which foreign objects may lodge. It is common practice for a workman to toss paper, rags and other debris into such a collecting system and such material may pass through the valve with no more obstruction than is encountered in the air duct. When the machine is shut down, the solenoid 72 is also deenergized which allows the armature 70 to fall thus releasing the tension tending to hold the valve open. The tension in the spring tending to return the valve to the closed position then takes over and the pulley is rotated to the closed position.

For a completely satisfactory operation, the solenoid must necessarily be mounted in a vertical position. This is accomplished by removing the mounting bolts which hold the housing 30 to the section 10 of the valve body and positioning the housing as required by the angle of the ducting. The pulley 48 is released and rotated until the pin 46 engages the proper grooves 52 to move the valve member 18 through its rotative path upon actuation of the solenoid 72. Screw 40 then holds the pulley in the adjusted position.

It is to be understood that the specific nature of the present disclosure is not intended to be restricted or confining and that various rearrangements of parts and modifications of design may be resorted to without departing from the scope or spirit of the invention as herein claimed.

What is claimed is:

1. A valve for a duct line comprising a hollow body having an inlet and outlet and a continuous passageway therebetween, a semi-circular valve member pivotally mounted in the body, a spool means connected to said member, a solenoid connected to a portion of said spool by a first spring, a second spring connected to said spool and body, whereby actuation of said solenoid positions said spool by tensioning said first spring to overcome the tension of the second spring, thereby moving said spool to open said valve member.

2. A valve for a duct line comprising a hollow body having an inlet and outlet and a continuous passageway therebetween, a semi-circular valve member pivotally mounted in the body adapted to close the passage through the valve in the closed position and being conformed to the shape of the inlet and outlet in the open position, a spool means connected to said valve member for moving said valve member, a power means, a first spring means connecting said spool means to said power means, a second spring means connected to said spool means and said body whereby actuation of said spool means by the power means tensions said first spring to move said spool means, thereby overcoming the tension of said second spring means to open said valve member and whereby deactuation of said power means allows said second spring to close said valve member.

3. A valve for a duct line comprising a hollow body having an inlet and an outlet and a continuous passageway therebetween, a semi-circular valve member pivotally mounted in the body adapted to close the passage through the valve in the closed position and being conformed to the shape of the inlet and outlet in the open position, a means connected to said valve member for pivoting said valve member, a power means, a resilient spring means connecting said pivoting means to said power means and resilient means connecting said pivoting means to said body, whereby actuation of said power means tensions the resilient means connected to the power means to move said pivoting means, thereby overcoming the tension of the resilient means connected to said body to open said valve member and whereby deactuation of said power means allows said resilient means connected to the body to close said valve member.

(References on following page)

References Cited in the file of this patent

UNITED STATES PATENTS

| | | |
|---|---|---|
| 472,461 | Lundstedt | Apr. 5, 1892 |
| 562,124 | Doolittle | June 16, 1896 |
| 1,049,845 | Geissinger | Jan. 7, 1913 |
| 1,656,184 | Enz | Jan. 17, 1928 |
| 1,938,443 | Telford | Dec. 5, 1933 |
| 2,297,053 | Florio | Sept. 29, 1942 |
| 2,302,695 | Kalix | Nov. 24, 1942 |
| 2,370,021 | Downey | Feb. 20, 1945 |
| 2,450,049 | Kommer | Sept. 28, 1948 |
| 2,522,249 | Baker | Sept. 12, 1950 |
| 2,639,700 | Peitz | May 26, 1953 |
| 2,665,646 | Garrett | Jan. 12, 1954 |

FOREIGN PATENTS

| | | |
|---|---|---|
| 269,051 | Germany | Jan. 10, 1914 |
| 833,711 | Germany | Mar. 10, 1952 |